Feb. 23, 1937.  P. M. HULME  2,071,531
TEMPERATURE REGULATION
Filed June 29, 1932
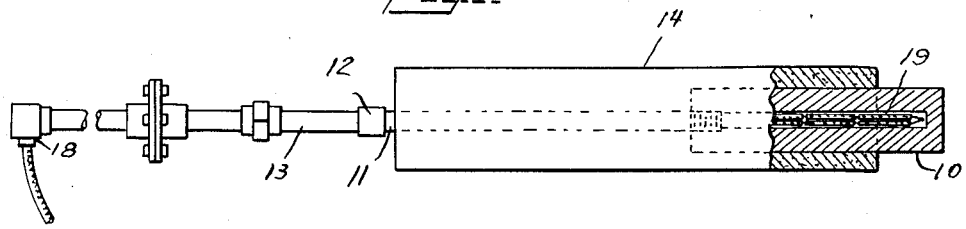
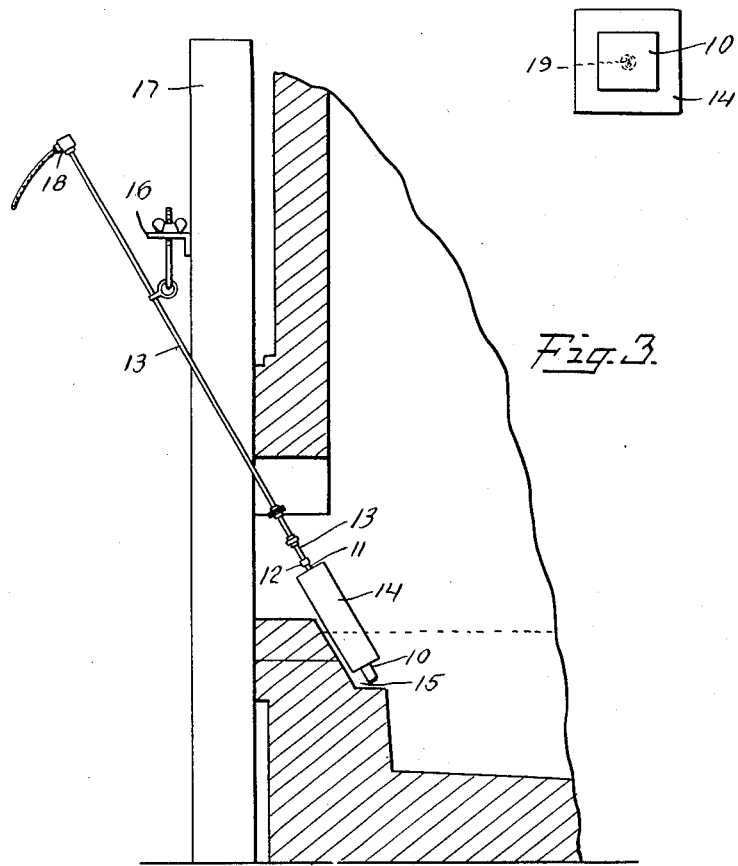
INVENTOR
Philip M. Hulme
BY
ATTORNEYS Patented Feb. 23, 1937

2,071,531

UNITED STATES PATENT OFFICE 2,071,531

TEMPERATURE REGULATION

Philip M. Hulme, Chuquicamata, Chile, assignor to Chile Exploration Company, New York, N. Y., a corporation of New Jersey Application June 29, 1932, Serial No. 619,869

2 Claims. (Cl. 136—4)

This invention relates to temperature regulation and has for an object the provision of an improved method and apparatus for measuring temperatures. More particularly, the invention contemplates the provision of an improved method and apparatus for use in ascertaining temperatures of molten metal baths. The invention further contemplates the provision of means for protecting the heat sensitive portions of temperature indicators employed in copper refining operations.

In the fire refining of metals such, for example, as copper the maintenance of proper temperatures is important and the provision of dependable means for accurately indicating temperature is desirable.

Heretofore it has been customary to rely upon the eye and judgment of men of long experience to properly regulate the temperature of the molten copper being refined. No matter how much experience a man has had it is impossible for him to judge the temperature much closer than plus or minus 50° F. In most cases, even this degree of accuracy is impossible due to variations in the human element. It has happened frequently that two men of equal experience have disagreed entirely as to whether the metal of a particular bath was too hot or too cold.

It has also been proposed to employ thermocouples in conjunction with suitable recording instruments for indicating the temperatures of the molten metal baths. Considerable difficulty has been encountered in employing thermocouples owing to the fact that no suitable means has been provided heretofore for inserting the hot junction of the thermocouple wires in the molten metal in such a manner that the wires will not be exposed to the corrosive action of the hot metal. It has been proposed to employ casings of suitable material for protecting the wires of the thermocouple against the action of the hot metal. The use of protective casings, however, has been unsatisfactory because of the inability to place the junction of the wires in sufficiently intimate contact with the metal so that it will not only measure the temperature correctly but will also register any fluctuations. Both metallic and non-metallic protective casings for the thermocouples have been proposed for use. The metallic tubes are rapidly corroded by hot copper at the liquid level while the non-metallic refractory tubes are not only very expensive but are so impervious to heat that they take much too long to feel changes in temperature. This last disadvantage of refractories is so marked that the actual temperature of the metal may be much higher or lower than indicated by the instrument. Graphite tubes do not show such a lag, but they, too, are rapidly corroded at the liquid level.

I have found that iron or steel tubes are the least corroded of any of the metallic protection tubes and that graphite tubes are the most satisfactory of the non-metallic protection tubes, and I have used intermittent temperatures with portable instruments. At each reading the tube is exposed to the corrosion of the copper for not more than three minutes. Under these conditions the tubes will hold out for a maximum number of readings of about 20. This means only one hour's total immersion in the copper. If the tubes are kept continuously immersed they will not last for more than three-quarters of an hour. The wash of the molten copper at the liquid level rapidly corrodes the iron or graphite at this point and the tube gives way. Moreover, if a plain iron or graphite tube is introduced through the wall of the furnace in order to take the temperature of the molten bath, not only does the tube give way rapidly but the temperatures obtained are incorrect.

The misleading temperatures are due to the following causes:— Iron and graphite are very good conductors of heat. The temperature of the flames above the metal bath are generally much higher than the temperature of the bath itself. For practical reasons, noted below, it is necessary to put the tube through the wall above the metal level and then tip it up so that it slants down into the copper. For this reason a portion of the tube is exposed to the direct heat of the flames. Hence, this exposed part becomes hotter than the end that is in the copper, and part of the heat is conducted down the tube to the hot junction. Thus, the thermocouple measures, not the true temperature of the copper, but some temperature midway between the temperature of the flames and the temperature of the metal bath. To introduce the tube through the wall below the bath level is impractical and dangerous because of possible leakage of the furnace. Because of the foregoing it has always been extremely difficult to obtain temperatures in the furnace that can be relied upon.

Refractory tubes introduced into the furnace as semi-permanent fixtures are unsatisfactory. They not only suffer the disadvantages of all refractory tubes, namely, high temperature lag, but also deteriorate rapidly due to the sharp change of temperature when the furnace is opened for charging.

During the course of my experiments I noticed that, while iron and graphite tubes corroded rapidly at the surface of the molten copper, the part of the tube well below the surface was hardly affected at all. This observation led to the belief that, if the iron or graphite at the level of the liquid metal could be protected, the life of the protecting tube would be increased greatly. Further, if this protection were provided by a refractory of sufficiently low heat conductivity, and of the proper thickness a protecting tube having very desirable properties could be produced. There is always the danger when using a heavy protection of high heat conductivity that enough heat will be conducted, through the medium of the tube, away from the hot junction to cause the thermocouple to read low. In the same way, when the part of the tube above the liquid metal is exposed to an atmosphere that is hotter than the metal, heat is conducted down the tube to the hot junction causing the instrument to read too high. Proper heat insulation would correct both of these defects of the bare tube. By leaving the end of the iron or graphite tube, immediately surrounding the hot junction, directly in contact with the molten metal the desirable feature of sensitivity to temperature changes in the metal would be retained.

A protective device made in accordance with the invention will comprise a tube formed of a suitable heat conducting material such, for example, as metal or graphite protected with refractory material above, at and for some distance below the level of the liquid metal when the device is in its operative position and having the portion of the tube surrounding the hot junction bare of all refractory.

In the accompanying drawing,

Fig. 1 is a view, partly in section, of a protective device embodying the invention;

Fig. 2 is an end view of the device shown in Fig. 1; and

Fig. 3 illustrates a method of employing the protective device shown in Figs. 1 and 2.

In forming a protective device such as that shown in the drawing, a block of any good heat conductor, such, for example, as iron or steel or graphite, that will offer suitable resistance to corrosion by molten copper is drilled to within about an inch of one end to form a tube 10 having one sealed or closed end and one open end. The open end of the tube can be either tapped or reamed to fit a standard diameter pipe. A suitable length of pipe 11 is either threaded or welded into the open end of the tube. The diameter of the pipe and the opening in the tube should be just large enough that the thermocouple may be inserted easily. The free end of the pipe should be threaded with a standard thread so that it can be joined by either a coupling or a union 12 to the hollow metal handle 13 of a thermocouple. The drilled block with the pipe protruding from the open end of the hole constitutes the heat conducting portion of the protective tube. The whole is then placed in a form with the closed end of the block and the open end of the pipe protruding from opposite ends for from two to four inches. Refractory material 14, with or without reinforcing, is molded around the parts of the block and pipe inside the mold. The whole is then allowed to stand until the refractory sets. When this has taken place the mold is removed and the protecting tube placed in a warm place to thoroughly dry out. Some hours before immersion in the molten metal the tube is heated, slowly at first and finally strongly, until it approaches the temperature at which it will be used in the copper. Non-metallic refractory material such, for example, as a mixture of silica sand and Portland cement may be employed satisfactorily.

The following two types of protecting devices, which differ chiefly in size have been found to be very satisfactory for use in refining furnaces in casting ladles. Type "C" is used in the casting ladle and Type "H" in the furnace proper

*Type "C"*

Block of heat conducting material__3″ x 3″ x 8″
Hole drilled in block_____21/32″ diam. 7″ deep
Hole reamed or tapped for_____1″ depth
Hole reamed or tapped for_____¾″ std. pipe
Length of pipe protruding_____12″
Type of refractory used_____50% cement—50% silica sand
Dimensions of refractory covering__4½″ x 4½″ x 15″
Closed end of block protrudes_____3″
Open end of pipe protrudes_____2″

*Type "H"*

Block of heat conducting material__3″ x 3″ x 12″
Hole drilled in block_____21/32″ diam. 11″ deep
Hole reamed or tapped for_____1″ depth
Hole reamed or tapped for_____¾″ std. pipe
Length of pipe protruding_____16″
Type of refractory used_____50% cement—50% silica sand
Dimensions of refractory covering__4½″ x 4½″ x 23″
Closed end of block protrudes_____3″
Open end of pipe protrudes_____2″

In employing the apparatus of the invention, I prefer to insert the thermocouple in the tube 10 to within about ¼ inch of the bottom. The handle 13 is then coupled on and the device is ready to be heated up. In the case of the Type "H" fire ends, they are heated over a charcoal fire over night. In the case of the Type "C", they are clamped in place in the casting ladle and heated up at the same time as the ladle lining, which is of the same composition as the refractory covering 14.

The Type "H" device is inserted in the furnace in a specially prepared recess channel 15 in the wall at one of the doors. The method of inserting the device in the furnace is of extreme importance. If it is not recessed into the wall it is liable to damage from a floating pole or brand during the period of reduction. If it is not clayed and bricked in solidly the strain due to the wash of the metal will fracture it and the thermocouple will be lost. I prefer to lower it into the metal in the channel at an angle of about 60° so that the closed end of the block or tube 10 is about 8 inches below the surface. The handle 13 is then firmly clamped to a bracket 16 on the buck-stays 17 outside the door. Two fire bricks are wedged in place on the slanting surface of the protecting tube above the metal line. These two bricks serve to protect the cement-silica refractory from any splash of molten copper. The whole is then firmly clayed in place with a mixture of fire clay and coarse silica. This method gives excellent results, but it is rather hot and tedious work.

The Type "C" devices for the ladle present no difficulties whatever. The tube is adjusted so that the closed end of the block or tube 10 is about 8 inches below the surface of the copper. The device must be suspended so that it can move freely as the ladle is tipped for pouring.

Both types of device are connected by means of plug switches 18 with a recording thermoelectric pyrometer (not shown) having a range of 0 to 2400° F. and an accuracy of plus or minus 5° F.

It is my practice to insert the Type "H" device in the furnace during the last half hour of the blowing, or oxidizing period. Temperatures are recorded from this source all during the poling or reducing period and for about one-half hour after the casting has started. The recording instrument is then shifted over to the Type "C" device in the casting ladle and temperatures recorded from this source all during the hours of casting. Immediately the instrument has been thrown over to the Type "C" the Type "H" is uncoupled from the protecting tube and the thermocouple slowly removed so as not to break the porcelain insulators 19. The Type "H" protective device is left in the furnace until it is opened for charging when it is removed and discarded, and the channel prepared for the next charge.

At the end of casting operation the Type "C" is simply removed from the copper, allowed to cool, and inspected for the possibility of using it again on the next charge. Sometimes, although the refractory is worn out, the other parts may be salvaged. The old refractory casing or tube is then broken off and a new one cast around the salvaged parts.

I claim:—

1. Apparatus for measuring the temperature of molten metal comprising a block of good heat conducting material having a recess formed in a face thereof to provide a tube having a sealed end and thick walls, a thermocouple mounted within and extending to a point adjacent to but spaced from the bottom wall of the recess in the block, a substantially straight, thin-walled pipe attached to the block in alignment with and communicating with the recess in the block, said pipe and said block forming a substantially straight continuous tubular member having one end sealed and the other end open whereby the thermocouple may be inserted through the open end into the recess in said block, means for connecting the thermocouple with a temperature indicating device and a layer of heat insulating material surrounding the block and pipe between their opposite ends, the portion of the block adjacent the bottom of the recess being exposed to permit contact of its outer surface with molten metal to be tested, and the layer of heat insulating material surrounding the pipe being capable of preventing the flow of a substantial amount of heat therethrough to the walls of the pipe.

2. A protective casing for a thermocouple comprising a block of good heat conducting material having a recess formed in one end thereof and adapted to be inserted in molten metal, a substantially straight thin-walled pipe attached to the block in alignment with and communicating with the recess therein, said pipe and said block forming a substantially straight continuous tubular member having one end sealed and the other end open whereby a thermocouple may be inserted through the open end into the recess in said block, and a protective coating molded around the block and the thinwalled pipe, the protective coating terminating short of the extremity of the block that is immersed in the molten metal.

PHILIP M. HULME.